July 2, 1968     S. R. FLORIAN     3,390,455
LOPPING SHEARS
Filed Jan. 14, 1966     3 Sheets-Sheet 2

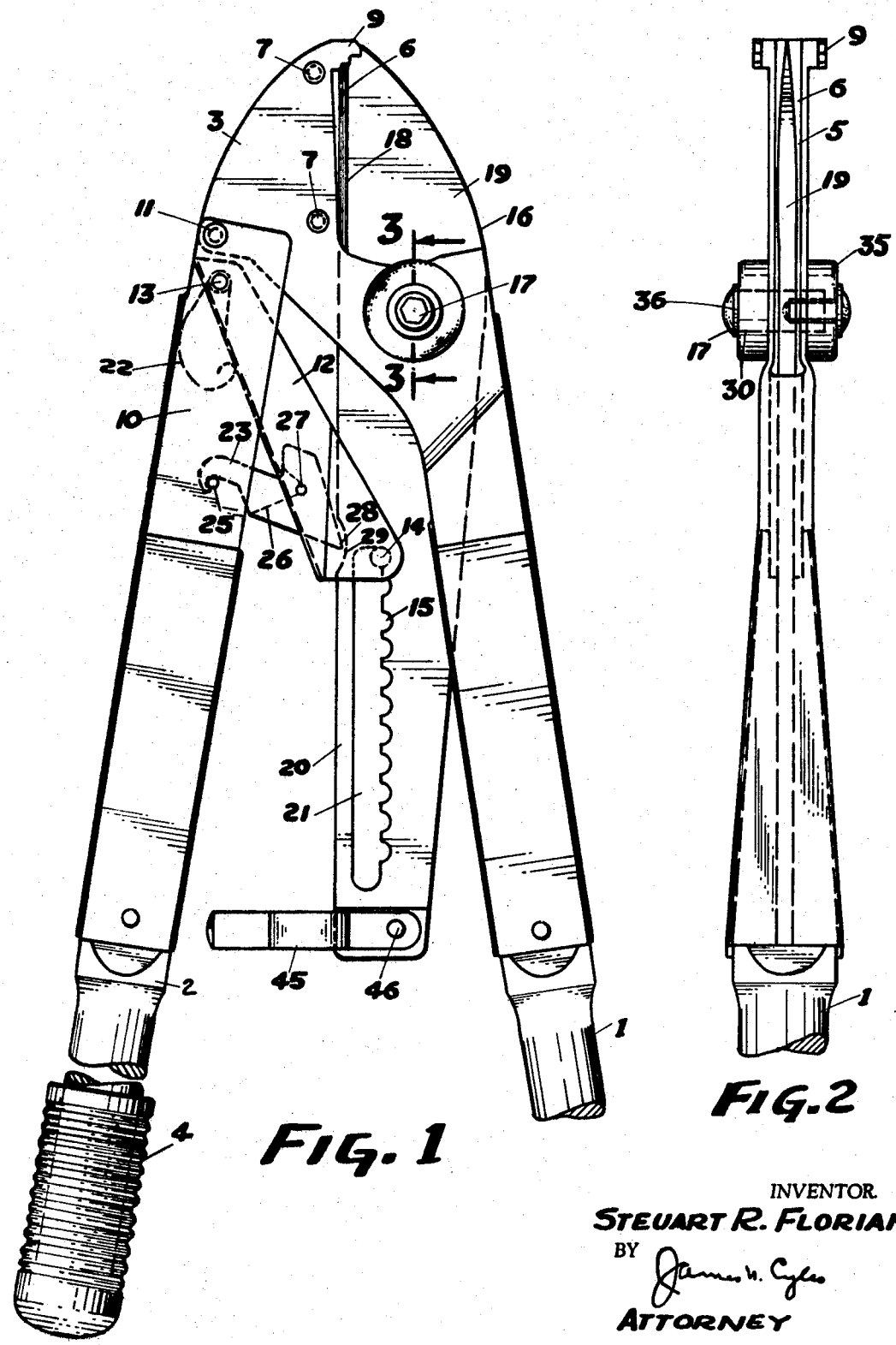

INVENTOR.
STEUART R. FLORIAN
BY
ATTORNEY

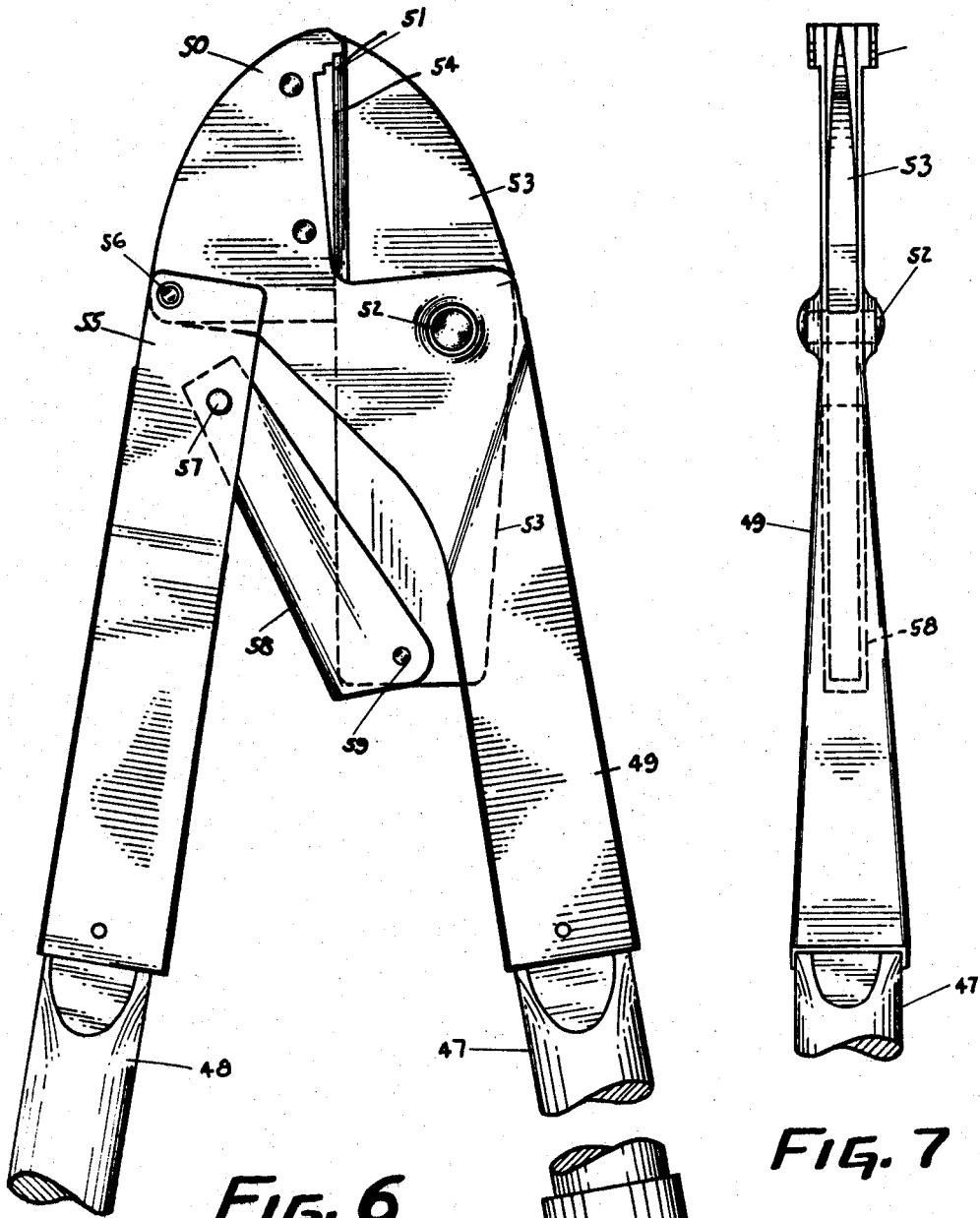
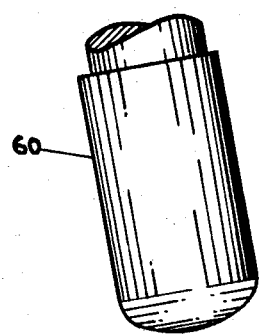
Fig. 6
Fig. 7
INVENTOR
STEUART R. FLORIAN
ATTORNEY 3,390,455
LOPPING SHEARS
Steuart R. Florian, 1 West St., Plantsville, Conn. 06479
Filed Jan. 14, 1966, Ser. No. 520,773
7 Claims. (Cl. 30—251)

ABSTRACT OF THE DISCLOSURE

The invention relates to a shears having pivotally connected jaws, one of said jaws having a handle rigidly attached to it and a second handle pivotally attached to it, the latter handle being linked to a second jaw, with means for regulating the cutting force imposed by the jaws through manipulation of said handles.

---

This invention relates to lopping shears such as are used for cutting or trimming branches of trees or bushes or for the cutting of wires, rods and for many other purposes.

It is an object of the invention to provide a shears of this type by means of which a powerful cutting force can be imposed upon the object to be severed whereby very efficient cutting is obtained.

It is an object of the invention to provide a mechanism in a shears of this type by which the jaws of the shears can be opened and closed to the required extent by either a short movement of the operating handles or by a longer movement to thereby regulate the cutting force imposed by the jaws.

More particularly the invention contemplates the provision of a pair of pivotally connected jaws between which the article to be cut is engaged, one of said jaws having a rigid handle attached to it at an outer portion thereof and said jaw also having a second handle pivotally attached to it. A link or lever has one end pivotally attached to the pivotal handle, said link having its other end provided with a cross pin that is slidable in a slot formed in and extending longitudinally of the second jaw and engaging ratchet teeth along one edge of the slot. A spring-biased latch member is pivoted on the link or lever and it is arranged to engage a pin provided on the pivoted handle.

With these and other objects to be hereinafter set forth in view, I have devised the arrangement of parts to be described and more particularly pointed out in the claims appended hereto.

In the accompanying drawings, wherein an illustrative embodiment of the invention is disclosed, FIG. 1 is a face view of a pair of cutting or lopping shears constructed in accordance with the invention;

FIG. 2 is an edge view of the same as seen from the right of FIG. 1;

FIG. 6 is a fragmentary side elevation of a modified form of cutting or lopping shears, and FIG. 7 is an edge view thereof.

Figure 4:
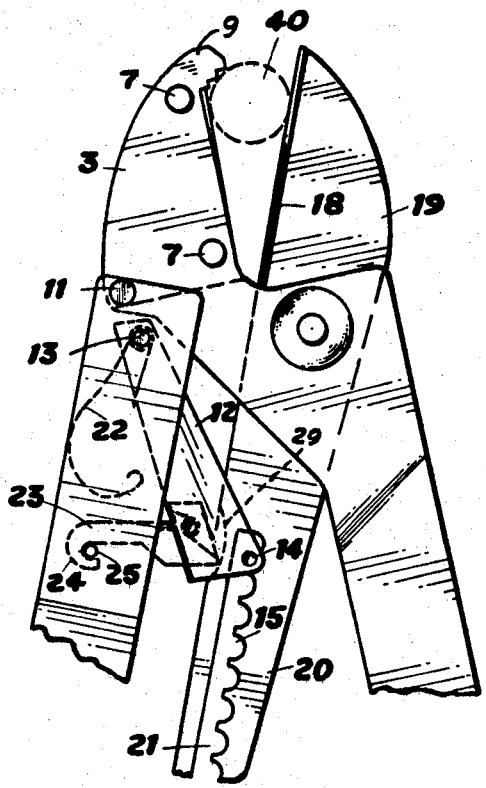
FIG. 4 is a view showing the shears performing the cutting operations while the latch is in its engaged position.

Referring to the drawings, 1 indicates one of the handles of the shears, and 2 indicates the second handle thereof. Both of the handles may be provided with suitable grip portions 4. The handle indicated at 1 has a forward part fitted on it, said part including a jaw 3 that is bifurcated as shown at 5 and secured between the walls of the jaw 3 by means of the rivets 7 is a part which constitutes an anvil 6. The jaw 3 is provided beyond the forward end of the anvil 6, with serrated article-engaging nose portions 9.

The handle indicated at 2 has a bifurcated forward extension 10 which straddles the jaw 3 and is pivotally attached thereto by means of a pivot pin 11. This arrangement is such as to allow the handle 2 to be swung to or from the handle 1 in order to increase the leverage by the toggle action of the link 12.

Pivoted on a pivot pin 13, located near to the pivot 11 and between the walls of the bifurcated part 10 of the handle 2, is one end of a channel-shaped lever 12 which constitutes a link between the part 10 and a second jaw 16. Said lever or link 12 is provided at its opposite end between its walls with a cross pin 14 for engagement with a slot 21 having a plurality of notches or serrations 15 provided along one of its edges and in the second jaw member 16 that is pivoted at 17 between the walls of the bifurcated jaw 3.

The second jaw 16 has a cutting blade 19 formed with a cutting edge 18 for cooperation with the anvil 6 in performing a cutting or lopping operation. The jaw 16 is provided with a shank portion 20 which is located between the handles 1 and 2, said shank portion 20 being provided with the elongated, longitudinally-extending slot 21 in which the cross pin 14 rides.

The longitudinal edge of the slot 21 that is notched or serrated as at 15 constitutes a ratchet element with which the cross pin 14 engages. A leaf spring shown at 22 of wishbone type tends to bias the link or lever 12 to bring its cross pin 14 into engagement with the serrations 15.

The lever or link 12 is provided near its inner end with a spring-biased latch member 23 having a hooked free end 24 adapted for engagement around a stud 25 extending between the walls of the portion 10 of the handle 2. Said hooked latch member 23, biased by the spring 26, is pivoted at 27 between the walls of the lever or link 12. One end 28 of the latch member 23 is adapted to engage in a notch or recess 29 formed in one of the longitudinal edges of the shank 20 of the second jaw 16.

Figure 3:
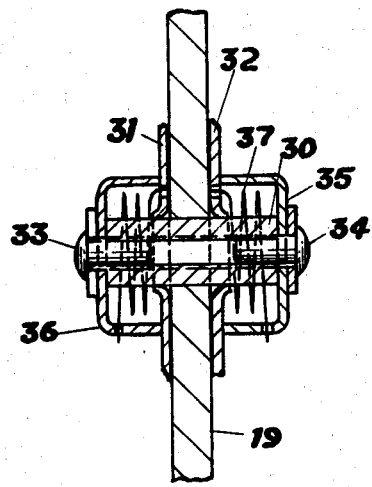
FIG. 3 is a sectional view, taken substantially on the line 3—3 of FIG. 1, looking in the direction of the arrows.

The arrangement of the pivot 17 which couples the jaws 3 and 16 together is disclosed in detail in FIG. 3, wherein it will be noted that a bushing 30 extends through the walls 31 and 32 of the jaw 3 as well as through the jaw 16. A bolt 33 passes through the bushing for a part of the length thereof, while a bolt 34 enters into the bushing from the opposite side of the tool. Caps 35 and 36 on the opposite sides respectively of the tool, fit over and enclose the ends of the bushing 30. A torsional spring 37 surrounds the bushing 30 and is operative to normally urge the jaws 3 and 16 toward one another.

Figure 5:
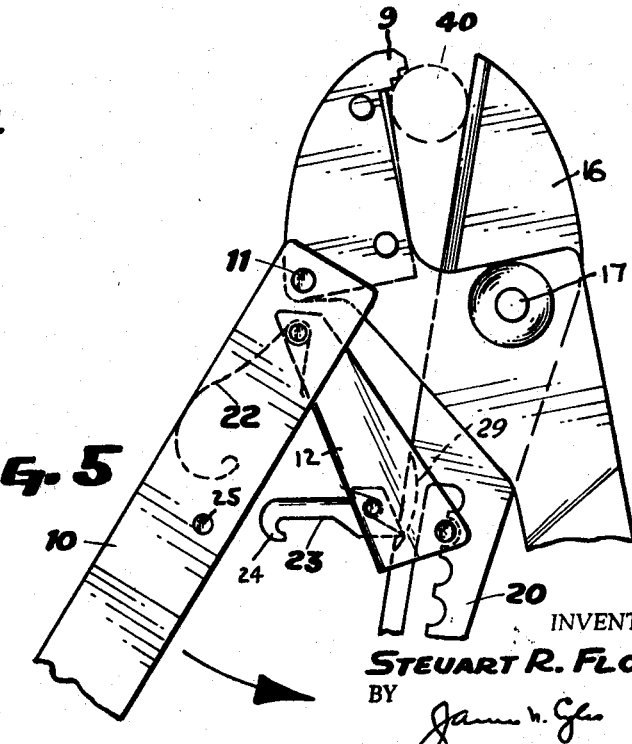
FIG. 5 is a view showing the latch disengaged and showing one of the handles being swung in a manner to bring the jaws to closed or cutting position.

The operation of the shears is substantially as follows:

When it is desired to sever an object such as the branch of a tree, a rod or wire or some other object such as is indicated at 40 in FIGS. 4 and 5, the handles 1 and 2 are swung apart, substantially as shown in FIG. 4 and while the latch member 23 is engaged with the pin 25, the swing of the handle 2 in a direction away from the handle 1 being relatively short, as in FIG. 4, to thus cause separation of the jaws 3 and 16 for a distance sufficient to permit the entry of an object 40 between the jaws. Thus, while the latch member 23 remains engaged with the pin 25, the travel of the jaws toward one another to sever the object 40 will be relatively short.

When it is desired to use considerable force in cutting through an object, a pull exerted on a clip 45 pivotally attached at 46 to the shank 20 of the jaw 16, will cause the latch member to become disengaged from the pin 25 due to the action of the notch 29 on the end 28 of the latch member, causing the same to be raised from the pin 25, and the handle 2 can be swung for a substantial distance away from the handle 1. When the parts are thus in the position shown in FIG. 5, a relatively wide swing of the handle to open the jaws is required and a similar return swing is needed to close the jaws and cause substantial cutting pressure to be applied on the object 40 to sever the same.

When the handle 2 is swung away from the handle 1 as above described, the pin 14 will ride up and down in the slot 21 engaging the notches 15 in a ratchet-like manner.

While I have herein referred to a tool of this kind as being a cutting or lopping shears, it will be apparent that the construction described may be readily applied to other types of tools and particularly to those in which movable co-operating gripping or cutting elements are employed. Also, while the latch member 23 is described in detail, it will be apparent that the incorporation of the same is not altogether necessary and it therefore may under certain conditions be omitted.

When the amount of force required to cut through an object exceeds the limits of human strength as applied to conventional cutting shears, the latch member 23 being automatically prevented from engagement with pin 25 by means of that portion of latch 23 being biased against the shank portion 20 of cutting blade 19, the handles 1 or 2 may be moved outwardly a certain distance without opening the jaws 3 and 19 any further than its present position. Handle 2 being opening thusly, pin 14 will engage in the nearest notch 15 and great leverage may then be gained to close jaws 3 and 19 by closing handle attached to portion 10.

This tool is also operable without latch 23 since the jaws may be opened by means of pin 14 pulling against the smooth edge of slot 21 after lever 12 has reached the limit of the arc in which it is free to travel.

The principal function of the latch 23 is to take up lost motion between handles 1 and 2 when cutting material light or small enough so that the leverage available is not necessary to complete the cut.

Referring now to FIGURES 6 and 7 wherein has been illustrated the modified form of the device, the numerals 47 and 48 indicate a pair of handle members, corresponding to handle members 1 and 2 of the first form of the device. The handle member 47 has fitment into a hollow metallic handle 49 that terminates its upper portion in a bifurcated jaw 50, carrying an anvil 51 and the jaw 50 is substantially identical to the jaw 3 of the first form of the device. Pivotally connected to the member 49, as shown at 52, is a cutting blade 53, having a sharpened cutting edge 54 that is movable toward the anvil 51. The blade 53 extends downwardly from the pivot 52 to a point between the handle members 47 and 48 and a channeled member 55 is pivoted to the jaw 50, as shown at 56. Pivotally connected to the member 55, between the walls thereof, as shown at 57, is a channel link 58, the lower end of which is pivotally connected to the blade 53 as illustrated at 59. The handles 47 and 48 at their free ends are provided with the usual ferrules 60 and as illustrated in the first form of the invention as being ferrules 4.

In the use of this form of the invention, the handles 47 and 48 are swung apart, causing the blade 53 to move away from the anvil 51 and as the handles are moved apart, the link 58 pulls the blade 53 and its cutting edge 54 away from the anvil and the tool is then engaged with a workpiece to be severed. With the jaws and the anvil overlying the workpiece, the handles 47 and 28 are shifted toward each other, causing the link 48 to swing the blade 53 toward the anvil 51 and imparts to the blade 53 a forceful cutting action against the workpiece and, since the handles 47 and 48 are relatively long, extreme leverage will be imparted to the blade 53 and greatly facilitating the cutting of the workpiece with relatively little pressure. It is believed, that this form of the invention is desirable where relatively light branches or other workpieces are presented between the cutting jaws and the approximately only difference between the device illustrated in FIGS. 6 and 7 omits the ratchet teeth 15 of the plate 19 and does not provide for a step-by-step ratchet movement such as that illustrated in the first form of the invention.

Having thus described a single embodiment of the invention, it is obvious that the same is not to be restricted thereto, but is broad enough to cover all structures coming within the scope of the annexed claims.

What I claim is:

1. In a shears or like tool, first and second jaws pivotally connected together and between which an object is engaged, a handle member pivotally connected to the first jaw adjacent its outer edge, a second handle member fixed to the first jaw, a lever pivotally connected at one end to the pivoted handle member below the pivotal connection of the handle member to the first jaw, the second jaw having a slot for engagement by the opposite end of the lever, said slot having a serrated edge, and spring means operative on the lever for biasing same into engagement with the serrated edge.

2. In a shears or like tool, first and second jaws pivotally connected together and between which an object is engaged, a handle member pivotally connected to the first jaw, a second handle member fixed to the first jaw, a lever pivotally connected at one end to the pivoted handle member, the second jaw having a slot for engagement by the opposite end of the lever, said slot having a serrated edge, and spring means operative on the lever for biasing same into engagement with the serrated edge, the slotted and serrated jaw having its serrations along a longitudinal edge of its slot, the lever having an end portion straddling the slotted jaw and provided with a crosss pin located in the slot for engagement with the serrations.

3. In a shears or like tool having first and second co-operating jaws, said jaws being pivotally connected together, the second of the jaws having a cutting edge and the first jaw having an anvil portion for cooperation with the cutting edge, a handle rigidly attached to the first jaw, a second handle pivotally attached to the first jaw, a lever pivoted at one end to the pivotally-attached handle, the second jaw having an elongated slot having one of its edges defined by ratchet teeth, the second end of the lever having a pin extending through the slot for engagement with the ratchet teeth therein, and a spring engaging the lever and operative to bias it to bring the pin toward the ratchet teeth.

4. In a shears or like tool according to claim 3, and including a pivoted latch member carried by the lever and having a hooked end, and a pin carried by the pivoted handle for engagement by the hooked end of said latch member.

5. In a shears or like tool according to claim 4, wherein the second jaw has a notch in its edge facing the pivoted handle, and the latch member has an end portion engaged by the notch.

6. A shears or similar tool comprising, a first jaw and a second jaw pivotally connected together, the first jaw having an anvil portion and a projecting, internally-serrated nose portion overlying the forward end of the anvil portion, the second jaw having a shank provided with an elongated slot having one of its edges defined by ratchet teeth, a handle pivoted on the first jaw, a link pivoted at one end to the handle at a point adjacent to its pivotal connection to the first jaw, a pin at the opposite end of the link, said pin entering the slot and engaging the ratchet teeth therein, spring means for biasing the link to bring the pin thereon into engagement with the ratchet teeth, a spring-biased latch member carried by the link, and a pin carried by the pivoted handle for engagement by said latch member.

7. In a shears or similar tool the combination with elongated handles of first and second jaws, said first jaw being bifurcated, a first handle fixedly connected thereto, an anvil portion of said bifurcated jaw, a hollow shank, and a second handle having fixed connection therewith, the upper end of said shank being pivotally connected to the first named jaw, adjacent its outer edge and removed from said anvil portion, a jaw including a cutting blade pivotally connected to the bifurcated jaw member and projecting downwardly between the bifurcations to a point between the handles and a fulcrum link pivotally connected to the lower end of the cutting blade and to the upper end of the hollow shank whereby movement of the handles toward and from each other will actuate the cutting blade to and from a cutting position with respect to the anvil.

References Cited

UNITED STATES PATENTS

| | | | |
|---|---|---|---|
| 1,104,768 | 7/1914 | Bernard | 30—258 |
| 2,311,695 | 2/1943 | Romanoff | 30—190 |
| 2,520,905 | 9/1950 | Borelli | 30—243 X |
| 2,714,198 | 7/1955 | Schloetzer | 81—413 X |
| 1,820,169 | 8/1931 | Wigand | 30—190 X |
| 3,273,240 | 9/1966 | Florian | 30—251 |

ROBERT C. RIORDON, *Primary Examiner.*

WILLIAM FELDMAN, OTHELL M. SIMPSON *Examiners.*

J. C. PETERS, *Assistant Examiner.*